(12) United States Patent
Benish

(10) Patent No.: US 10,715,412 B1
(45) Date of Patent: Jul. 14, 2020

(54) SYSTEMS AND METHODS FOR MONITORING OF OVERALL LATENCY

(71) Applicant: Gigantic Ltd., Tel-Aviv (IL)

(72) Inventor: Alex Benish, ModiIn (IL)

(73) Assignee: Gigantic Ltd., Tel-Aviv (IL)

( * ) Notice: Subject to any disclaimer, the term of this patent is extended or adjusted under 35 U.S.C. 154(b) by 0 days.

(21) Appl. No.: 16/809,712

(22) Filed: Mar. 5, 2020

(51) Int. Cl.
*H04L 12/26* (2006.01)
*H04L 29/08* (2006.01)
*G06K 9/00* (2006.01)

(52) U.S. Cl.
CPC ...... *H04L 43/0894* (2013.01); *G06K 9/00718* (2013.01); *H04L 67/125* (2013.01); *G06K 2009/00738* (2013.01)

(58) Field of Classification Search
CPC .. G06F 3/0485; G06F 3/0488; G06F 3/04817; G06F 3/04842
See application file for complete search history.

(56) References Cited

U.S. PATENT DOCUMENTS

| | | | | |
|---|---|---|---|---|
| 8,737,986 B2* | 5/2014 | Rhoads | ............... | G01C 21/3629 455/426.1 |
| 9,602,729 B2* | 3/2017 | King | .................. | G06K 9/00624 |
| 9,674,426 B2* | 6/2017 | Penha | ................. | H04N 5/23216 |
| 9,860,451 B2* | 1/2018 | Penha | .................... | G06F 3/0488 |
| 10,547,776 B2* | 1/2020 | Brown | ................. | H04N 1/2145 |
| 2012/0208592 A1* | 8/2012 | Davis | ....................... | H04N 5/77 455/556.1 |
| 2014/0106710 A1* | 4/2014 | Rodriguez | ............ | H04W 12/04 455/411 |
| 2014/0142958 A1* | 5/2014 | Sharma | .................... | G10L 19/02 704/500 |
| 2016/0360097 A1* | 12/2016 | Penha | ................. | G06F 3/04883 |
| 2016/0360098 A1* | 12/2016 | King | ...................... | G11B 27/34 |
| 2016/0360116 A1* | 12/2016 | Penha | ................. | H04N 1/2125 |
| 2018/0091728 A1* | 3/2018 | Brown | ................ | G06F 3/04883 |
| 2020/0120265 A1* | 4/2020 | Brown | .............. | H04M 1/72522 |

* cited by examiner

*Primary Examiner* — Ranodhi Serrao

(57) ABSTRACT

There is provided, a computer-implemented method of monitoring overall latency, comprising: monitoring a sequence of images of an actuator controlled by a user interface presented on a display of a client terminal, detecting, in a first image of the sequence of images, a first visual indication denoting termination of a user triggered activation of movement of the actuator via the user interface, detecting, in a second image of the sequence of images, a second visual indication denoting termination of the movement of the actuator in response to the termination of the user triggered activation, computing an overall latency from a timestamp associated with the second image and a timestamp associated with the first image, and when the overall latency is above a threshold, adjusting at least one system parameter of a system connecting the client terminal with the actuator and with a camera that captures the sequence of images.

19 Claims, 4 Drawing Sheets

SYSTEMS AND METHODS FOR MONITORING OF OVERALL LATENCY

FIELD AND BACKGROUND OF THE INVENTION

The present invention, in some embodiments thereof, relates to monitoring of system latency and, more specifically, but not exclusively, to systems and methods for monitoring of overall latency.

Network latency, which is usually low even for packets travelling across the glove, is usually irrelevant for most applications. For example, a web site that takes a second or two to load on a browser does not really affect user performance. However, for real time applications, network latency may be significantly apparent to a user and affect quality of the application. For example, delays in packets of even 1 second or less affect quality of a voice call transmitted via packets over the network.

SUMMARY OF THE INVENTION

According to a first aspect, a computer-implemented method of monitoring overall latency, comprises: monitoring a sequence of images of an actuator controlled by a user interface presented on a display of a client terminal, detecting, in a first image of the sequence of images, a first visual indication denoting termination of a user triggered activation of movement of the actuator via the user interface, detecting, in a second image of the sequence of images, a second visual indication denoting termination of the movement of the actuator in response to the termination of the user triggered activation, computing an overall latency from a timestamp associated with the second image and a timestamp associated with the first image, and when the overall latency is above a threshold, adjusting at least one system parameter of a system connecting the client terminal with the actuator and with a camera that captures the sequence of images.

According to a second aspect, a system for monitoring overall latency, comprises: at least one hardware processor executing a code for: monitoring a sequence of images of an actuator controlled by a user interface presented on a display of a client terminal, detecting, in a first image of the sequence of images, a first visual indication denoting termination of a user triggered activation of movement of the actuator via the user interface, detecting, in a second image of the sequence of images, a second visual indication denoting termination of the movement of the actuator in response to the termination of the user triggered activation, computing an overall latency from a timestamp associated with the second image and a timestamp associated with the first image, and when the overall latency is above a threshold, adjusting at least one network system of a system connecting the client terminal with the actuator and with a camera that captures the sequence of images.

According to a third aspect, a computer program product for monitoring overall latency, comprises: a non-transitory memory storing thereon code for execution by at least one hardware process, the code including instructions for: monitoring a sequence of images of an actuator controlled by a user interface presented on a display of a client terminal, detecting, in a first image of the sequence of images, a first visual indication denoting termination of a user triggered activation of movement of the actuator via the user interface, detecting, in a second image of the sequence of images, a second visual indication denoting termination of the movement of the actuator in response to the termination of the user triggered activation, computing an overall latency from a timestamp associated with the second image and a timestamp associated with the first image, and when the overall latency is above a threshold, adjusting at least one system parameter of a system connecting the client terminal with the actuator.

In a further implementation form of the first, second, and third aspects, the sequence of images is obtained by a screen capture operation that captures the display of the client terminal.

In a further implementation form of the first, second, and third aspects, the actuator is connected to a server in communication with the client terminal over the network.

In a further implementation form of the first, second, and third aspects, the actuator and the client terminal are geographically located at least 5000 kilometers apart.

In a further implementation form of the first, second, and third aspects, the threshold is in the range of about 400-600 milliseconds (ms).

In a further implementation form of the first, second, and third aspects, the adjusting of the at least one system parameter is selected according to a prediction by a model of a reduction in the overall latency below the threshold.

In a further implementation form of the first, second, and third aspects, the sequence of images of the actuator include graphical elements of the user interface that control the actuator when activated by a user.

In a further implementation form of the first, second, and third aspects, the first visual indication is a graphical element that is removed from the image in response to termination of the activation of the user interface by the user.

In a further implementation form of the first, second, and third aspects, the second visual indication is a turning off of a light that is hard wired to the actuator to turn off when the actuator stops movement, wherein the light is on during movement of the actuator.

In a further implementation form of the first, second, and third aspects, the first image and the second image are detected by a classifier that is fed the sequence of images, the classifier being trained on a training dataset of training images including the first and second visual indications and corresponding labels.

In a further implementation form of the first, second, and third aspects, further comprising detecting, in another image of the sequence of images prior to the first image, the first visual indication in a first state denoting activation of the user interface by the user to initiate the movement of the actuator, wherein the detected first visual indication of the first image is the first visual indication in a second state.

In a further implementation form of the first, second, and third aspects, the first state comprises presence of the first visual indication, and the second state comprises disappearance of the first visual indication.

In a further implementation form of the first, second, and third aspects, further comprising detecting, in another image of the sequence of images prior to the second image, the second visual in a first state denoting activation of the user interface by the user to initiate the movement of the actuator, wherein the detected second visual indication of the second image is the second visual indication in a second state.

In a further implementation form of the first, second, and third aspects, the first state comprises activation of the second visual indication, and the second state comprises de-activation of the second visual indication.

In a further implementation form of the first, second, and third aspects, the overall latency is computed as a difference between the timestamp associated with the second image and the timestamp associated with the first image.

In a further implementation form of the first, second, and third aspects, the monitoring, the detecting the first visual indication, and the detecting the second visual indication, are performed by a monitoring server connected to the network, the monitoring server being external and located remotely from the actuator and the client terminal.

In a further implementation form of the first, second, and third aspects, the actuator is connected to a crane having a claw that is operable to move the claw to a target location and grab an object.

In a further implementation form of the first, second, and third aspects, the at least one system parameter is selected from the group consisting of: network configuration, video format, percent of dropped frames in a video stream, reliability of network protocol.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
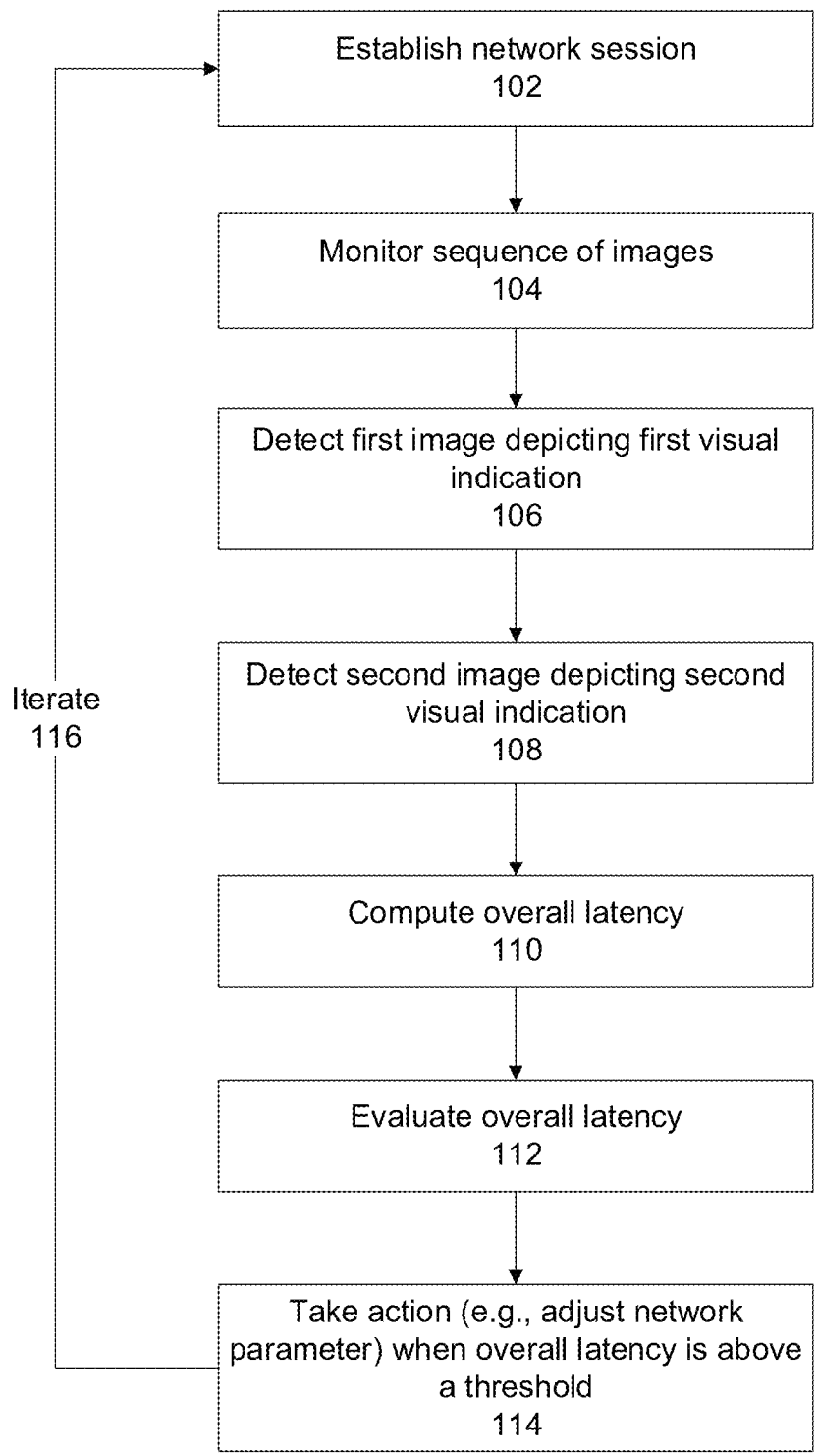
FIG. 1 is a flowchart of a method for monitoring overall latency based on images, in accordance with some embodiments of the present invention.

The present invention, in some embodiments thereof, relates to overall latency and, more specifically, but not exclusively, to systems and methods for monitoring and/or adjustment of overall latency.

As used herein, the terms activating, controlling, orient, and/or moving, may sometimes be substituted with one another, and/or may share a common meaning, with reference to a user interface presented on a display of a client terminal used by a user to remotely, over a network, activate, control, orient, and/or move an actuator.

An aspect of some embodiments of the present invention relates to systems, methods, an apparatus, and/or code instructions (i.e., stored in a data storage device, executable by one or more hardware processors) for monitoring overall latency between a user interface presented on a display of the client terminal and an actuator controlled by the user interface, based on an analysis of images presented on a display of the client terminal. A sequence of images of the actuator are captured by a camera and transmitted over the network for presentation on the display of the client terminal. The sequence of images are captured during presentation on the display (e.g., using a screen capture process), and local analyzed and/or provided to a server for centralized analysis. The sequence of images of are monitored, locally by the client terminal and/or centrally by the serer, for detecting a first visual indication and a second visual indication. The first visual indication, which is detected in a certain image of the sequence (sometimes referred to herein as a first image), denotes termination of a user triggered activation of movement of the actuator via the user interface. The second visual indication, which is detected in another image of the sequence (sometimes referred to herein as a second image), denotes termination of the movement of the actuator in response to the termination of the user triggered activation. The overall latency is computed from a timestamp associated with the two identified images where the first and second visual indications were detected (i.e., the first and second images). Optionally, when the overall latency is above a threshold, an alert may be generated. For example, a message appears on the display, indicating to the user that the overall latency is above the threshold. Alternatively or additionally, when the overall latency is above the threshold, one or more system parameters of the system connecting the client terminal with the actuator are adapted, in an attempt to reduce the overall latency below the threshold. The parameters may be adapted automatically or manually. For example, instructions may be presented to the user with suggestions on how to reduce the overall latency below the threshold. The instructions may be default suggestions, and/or generated by code that analyzes system parameters. For example, that the internet connection is weak with a suggestion to move closer to the wireless router or wait until a better internet connection is established. In another example, network parameters are automatically adjusted in an attempt to improve the connection. The threshold may represent the maximum overall latency where the user, using the user interface, feels a real time experience in remotely controlling the actuator. For example, when the overall latency is above the threshold, the response of the actuator deviates from the user commands inputted via the user interface in an amount that is significantly noticeable to the user, and/or which lowers the ability of the user to accurately control the actuator. For example, the user releases a move button, but the actuator keeps on moving.

The overall latency represents the overall end user experience of the user using the client terminal to remotely activate the actuator. The overall latency includes latency effects of the end devices, of the camera, the actuator, and the client terminal presenting the images (e.g., latency due to buffering of the video camera), in additional to the delay introduced by the network(s) connecting the client terminal with a server connected to the actuator and/or to the camera. The overall latency is from multiple components along the path of the data flow. For example, latency from the client terminal to the actuator, for sending the instructions to control the actuator, and latency from the server connected to the camera to the client terminal, for sending images captured by the camera of the actuator to the client terminal.

At least some of the implementations of the systems, methods, apparatus, and/or code instructions described herein address the technical problem of maintaining low overall latency for interactive network applications, in particular, interactive games where a user remotely controls an actuator over a network using an interface presented on a display of a client terminal. At least some of the implementations of the systems, methods, apparatus, and/or code instructions described herein address the technical problem of providing and/or improving real time interaction to users using a user interface to remotely control an actuator over a network. Images of the actuator captured by a camera are streamed over the network for presentation on the display of the client terminal. The user presses button(s) on the interface for moving (e.g., displacing and/or orienting) the actuator. Delays in the video streaming over the network create a situation in which the initiation and termination of movement of the actuator are delayed with respect to the user using the remotely located interface. For example, the user is pressing a button on the user interface of the client terminal to move a claw controlled by the actuator forward. Once the user releases the button, the user expects the claw to stop moving. However, due to overall latency, the claw keeps on moving. The result is a mismatch between what the movement the user desires and the actual movement of the actuator. A significant overall latency results in a low quality interactive experience for the user due to a high mismatch between the remote movements of the actuator the user desires and the actual remote movement that occurs.

Standard approaches to measuring latency do not adequately capture the real user experience. Latency measurement approaches usually measure only network latency. For example, delay of packets travelling between two network nodes. Such approaches do not capture the actual real user experience, for example, the overall latency between when a user releases a button to stop movement of the actuator, and when the actuator actually stops moving.

At least some of the implementations of the systems, methods, apparatus, and/or code instructions described herein provide a technical solution to the technical problem by analyzing images depicting movement of the actuator and the user interface used to control the actuator, to compute overall latency. At least some of the implementations of the systems, methods, apparatus, and/or code instructions described herein improve the technical field of real time interactive control of an actuator over a network, by using images to measure the overall latency that directly impacts the user experience during the real time interactive control. At least some of the implementations of the systems, methods, apparatus, and/or code instructions described herein improve the technical field of measuring overall latency.

When the overall latency is too high (e.g., above a threshold), one or more system parameters (of the system connecting the client terminal with the actuator) may be adjusted in an attempt to reduce the overall latency below the threshold. The monitoring of overall latency may be performed dynamically and/or in real time, as the user is moving the actuator using the interface. Measuring overall latency using images provides the most accurate indication of how user experience in remotely controlling the actuator using the user interface is impacted (or not impacted). Other existing methods for measuring overall latency do not fully capture the effect on the real time user experience in remotely controlling the actuator using a user interface presented on a display of a client terminal.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
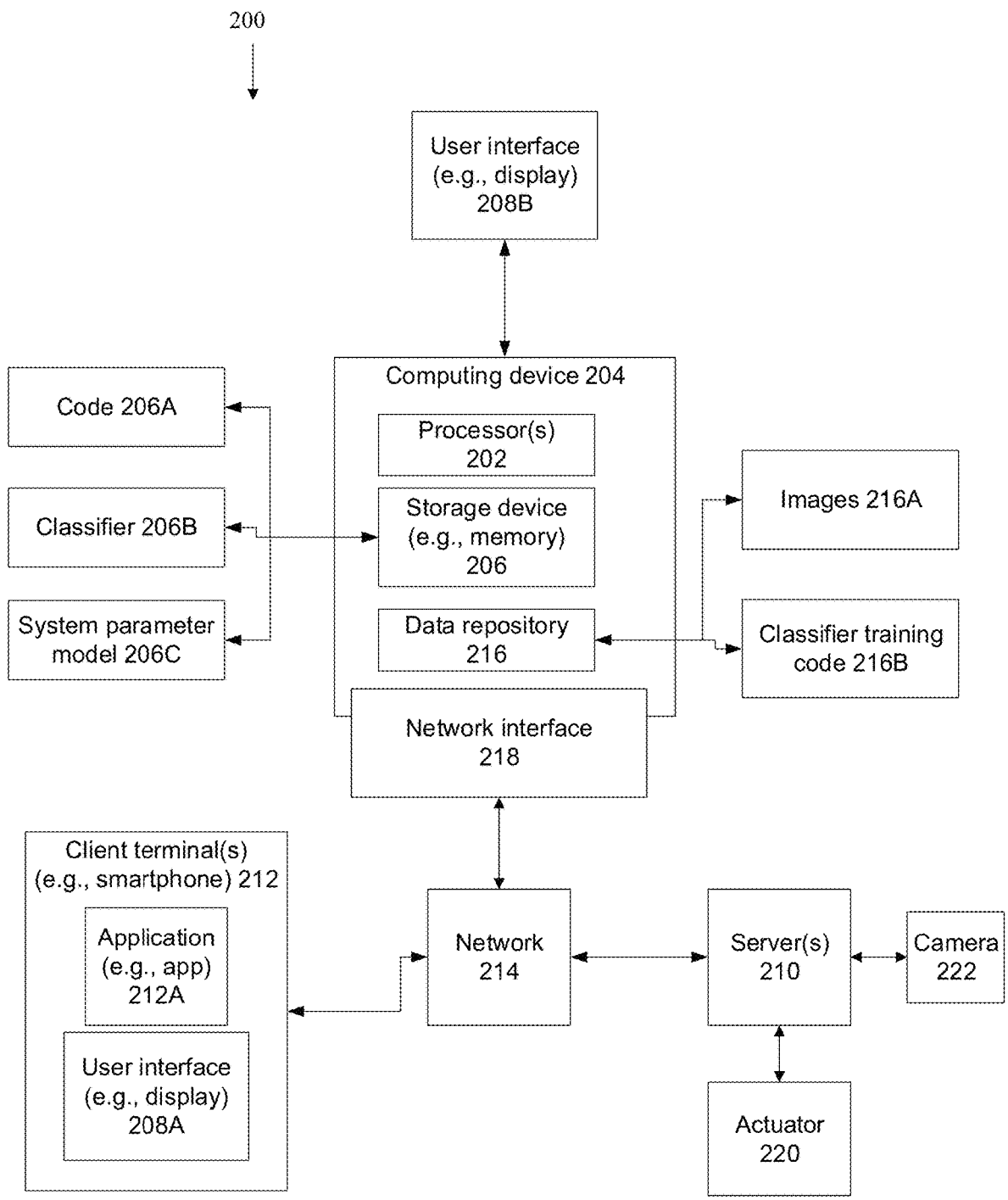
FIG. 2 is a block diagram of a system for monitoring overall latency based on images, in accordance with some embodiments of the present invention.

Reference is now made to FIG. 1, which is a flowchart of a method for monitoring overall latency based on images, in accordance with some embodiments of the present invention. Reference is also made to FIG. 2, which is a block diagram of a system for monitoring overall latency based on images, in accordance with some embodiments of the present invention. System 200 may implement the acts of the method described with reference to FIG. 1, by processor(s) 202 of a computing device 204 executing code instructions 206A (and/or 206B and/or 206C) stored in a storage device 206 (also referred to as a memory and/or program store).

As discussed in additional detail below, there may be multiple architectures of system 200. In one architecture, computing device 204 acts as a centralized server to one or more client terminals 212. Screen captures of application 212A on display 208A, which depict the user interface for controlling actuator 220 and images of actuator 220 captured by camera 222 are transmitted to computing device 204 over network. Computing device 204 analyzes the images for computing and/or monitoring the overall latency, as described herein. Alternatively, each client terminal 212 locally analyzes the captured images for locally computing and/or monitoring the overall latency, as described herein. It is noted that the training of the classifier 206B using classifier training code 216B may be performed by computing device 204 (e.g., centrally). The trained classifier 206B is provided to each client terminal 212 for local execution, as described herein.

Computing device 204 and/or client terminal(s) 212 and/or server(s) 210 may be implemented as, for example, a client terminal, a server, a computing cloud, a virtual server, a virtual machine, a mobile device, a desktop computer, a thin client, a Smartphone, a Tablet computer, a laptop computer, a wearable computer, glasses computer, and a watch computer.

Server(s) 210 is connected to an actuator 220, which is remotely controlled by client terminal(s) 212, for example, by a GUI of application 212A presented on a display 208A of client terminal 212, as described herein. Actuator 220 generates physical movement in one or more degrees of freedom, for example, up, down, left right, up tilt, down tilt, left rotate, right rotate, for example, by motors. Actuator 220 may include one or more sub-components, for example, a claw head that is operable to open and close. Server(s) 210 is connected to a camera 222 which is set to capture images of actuator 220. The images are transmitted over network 214 for presentation on display 208A of client terminal 212, optionally within the GUI presented by application 212A. Camera 222 may include one or more sensors, which capture images at certain wavelengths, for example, visible light, ultrasound, and infrared. Camera 222 captures a sequence of images at spaced apart time intervals (i.e., video). Exemplary cameras 222 include: charge-couple device (CCD), active-pixel sensor (CMOS), ultrasound sensor, and infrared sensor.

Application 212A is locally installed on client terminal 212, for example, as an app designed for installation on a smartphone. Applicant 212A may locally capture the images presented on display 208A of client terminal 212 which are analyzed for computing the overall latency, as described herein. Alternatively, the images presented on display 208A are captured by a screen capture process executing on the client terminal (e.g., library and/or standard function which may be part of the operating system) which may be trigged by execution of application 212A.

The multiple architectures of system 200 based on computing device 204 are now discussed in additional detail. In an exemplary implementation, computing device 204 storing code 206A and/or 206B, may be implemented as one or more servers (e.g., network server, web server, a computing cloud, a virtual server) that provides services (e.g., one or more of the acts described with reference to FIG. 1) to client terminals 212 over network 214, for example, providing software as a service (SaaS) to client terminal(s) 212, providing software services accessible using a software interface (e.g., application programming interface (API), software development king (SDK)), providing application 212A for local download to the client terminal(s) 212, and/or providing functions using a remote access session to the client terminals 212, such as through a web browser. For example, users use client terminals 212 to access servers 210 over network 214, for example, to control actuator 220 connected by server(s) 210 using application 212A (which may be installed on client terminal 212. For example, application 212A provides a graphical user interface for remotely controlling a claw connected to actuator 220, for moving the claw in order to attempt to grab prizes. Camera 222 captures images of actuator 220 that are presented on a display 208A of client terminal 212, such as within the GUI presented by application 212A. Screen captures of the display 208A, which includes images of actuator 220 captured by camera 222, and may include the GUI used by the user to control actuator 220, which may be presented within the GUI of application 212A (as described herein in more detail), are obtained by computing device 204. The screen of display 208A of client terminal 212 may be captured by application 212A and/or by other screen capture code running on client terminal 212. The images may be obtained by computing device 204, for example, by being transmitted from client terminal 212 to computing device 204 over network. In another example, the images captured by camera 222 of actuator 220 may be obtained by computing device 204 intercepting and/or sniffing traffic over network 214 to extract the images and/or by another network connected device that receives the images (e.g., forwarded images, by intercepting the packets storing the images, and/or by sniffing network traffic to extract the images) and forwards the images to computing device 204. Computing device 204 may act as a centralized server for processing images from multiple client terminals 212. Computing device 204 computes the network latencies for pairs of client terminals 212 and server(s) 212 (or actuators 220 and/or cameras 222), which may trigger adjustment of manual parameters, as described herein.

In another implementation, computing device 204 may include locally stored software (e.g., code 206A and/or 206B and/or 206C) that performs one or more of the acts described with reference to FIG. 1, for example, as a self-contained client terminal and/or server. For example, a smartphone of a user has code 206A and/or 206B installed thereon to dynamically compute overall latency while using application 212A to control actuator 220. Adjustment of system parameters may be performed by instructions issued, for example, by client terminal 212 and/or another administration server in response to the computed overall latency, as described herein. I.e., the features described with reference to computing device 204 may be performed by each client terminal. In yet another example, one or more features described as being performed by computing device 204 may be implemented by one or more other components, for example, client terminal(s) 212, server(s) 210, and/or other network nodes. For example, the training of classifier 206B (e.g. using classifier training code 216B) may be performed by computing device 204 and/or by another device. The trained classifier 206B may be provided to computing device 204 by the other device.

Processor(s) 202 of computing device 204 may be implemented, for example, as a central processing unit(s) (CPU), a graphics processing unit(s) (GPU). Processor(s) 202 may include a single processor, or multiple processors (homogenous or heterogeneous) arranged for parallel processing, as clusters and/or as one or more multi core processing devices.

Data storage device 206 stores code instructions executable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code 206A that implements one or more features and/or acts of the method described with reference to FIG. 1 when executed by processor(s) 202. Storage device 206 may store classifier code 206B that identifies indications in images and/or system parameter model 206C that computes adjustment to parameters of the system, including the network 214, and/or client terminal 212, and/or server 210, and/or camera 222, and/or actuator 220, for reducing the overall latency of system 200 connecting client terminal 212 with actuator 220 and/or camera 222, as described herein.

Computing device 204 may include a data repository 216 for storing data, for example, images 216A of actuator 220 and GUI of application 212A presented on display 208A of client terminal 212, as described herein. Data repository 216 may store classifier training code 216B for training classifier 206B, as described herein. Data repository 216 may be implemented as, for example, a memory, a local hard-drive, virtual storage, a removable storage unit, an optical disk, a storage device, and/or as a remote server and/or computing cloud (e.g., accessed using a network connection).

Network 214 may be implemented as, for example, the internet, a local area network, a virtual private network, a wireless network, a cellular network, a local bus, a point to point link (e.g., wired), and/or combinations of the aforementioned.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 212 include and/or are in communication with one or more physical user interfaces 208A-B that include an interface for a user to remotely control actuator 220. Exemplary user interfaces 208 include, for example, one or more of, a touchscreen, a display, a keyboard, a mouse, and voice activated software using speakers and microphone.

Referring now back to FIG. 1, at 102, a network session is established over a network between a client terminals and actuator.

A user interface, optionally a graphical user interface (GUI), is presented on a display of the client terminal. The user interface is designed for use by a user, for remotely activating the actuator. The user interface may be part of an application locally running on the client terminal.

The actuator is a physical, real world actuator that performs physical motions based on instructions received over the network from the user interface. For example, the actuator may move in 2 or 3 dimensions (e.g., right-left, forward-reverse, up-down), and/or may orient in 6 degrees of freedom (e.g., previous mentioned movements, and further including roll, pitch, and/or yaw), and/or performing certain movements (e.g., open/close claw, dig hole, spin propeller).

A camera captures images (e.g., sequence of still images and/or video) of the actuator during movement. For example, the camera is located in proximity to the actuator, and captures the actuator in the images. In another example, the camera is located on the actuator, and captures images as seen from the actuator during movement. The images are provided to the client terminal, for presentation on the display of the client terminal, optionally within the UI and/or GUI.

The actuator may be connected to a server (e.g., via cable, local wireless connection). The server is placed in communication with the client terminal over the network. The server converts instructions received from the client terminal into instructions for physically activating the actuator.

The actuator may be connected to one or more additional components that are controlled by the actuator. For example, the actuator is a motor connected to a robotic arm and/or claw.

The actuator and the client terminal may be physically geographically located far apart from one another, for example, at least 2000, or 5000, or 10000 or 15000 kilometers apart (or more for example, in outer space). The long distances may increase overall latency. Alternatively, the actuator and the client terminal may be physical geographically located close to one another, for example, in the same building, less than 1, 10, 100, or 1000 kilometers, or other values. Incorrectly set system parameters may affect overall latency, even when the client terminal and actuator are physically close.

The network session may be, for example, for remotely moving the actuator connected to a crane having a claw that is operable to move the claw to a target location and grab an object. The crane and claw may be, for example, part of a game of catching prizes. In another example, the crane and claw may be part of a remotely controlled robot that detonates bombs, an underwater robot that is picking up samples from the ocean floor, a spaceship that is picking up samples from another planet, and/or a remotely controlled digging machine that is digging holes for different purposes (e.g., construction, water well, a search for artifacts).

In another example, the network session may be, for example, a remotely controlled surgical robot for performing surgery on a patient by a doctor that is remotely located.

In another example, the network session may be, for example, a remotely controlled rover that explores remote terrain, for example, on another planet, under the ocean, and/or within an active volcano.

At 104, a sequence of images is received and/or monitored.

The sequence of images may include the images captured by the camera (i.e., of the actuator, or as seen from the actuator) and which are provided for presentation on the display of the client terminal. The sequence of images may include the user interface that controls the actuator when selected by a user, for example, graphical elements of a GUI such as one or more icons and/or buttons that triggers motion of the actuator in a certain direction and/or orientation.

The sequence of images may be obtained by a screen capture operation (e.g., locally executed by the client terminal) that captures the display of the client terminal while the user is activating the actuator. The display depicted in the captured screen images may include the received image captured by the camera, and the graphical elements used to control the actuator.

At 106, the sequence of images is analyzed to detect a first visual indication denoting termination of a user triggered activation of movement of the actuator via the user interface. The image where the first visual indication is detected is sometimes referred to herein a first image. It is noted that the term 'first image' does not necessarily mean that the first visual indication is detected in the first image of the sequence, but rather the term 'first image' is used as a label for the image in which the first visual indication is found.

Optionally, the first visual indication is identified by a removal of a previously existing visual element. For example, the first visual indication is identified when a graphical element that has previously been present on the display (e.g., within the GUI) is removed from the image in response to termination of the activation of the user interface by the user. For example, the first visual indication is identified when a circle, which was located in a certain location within the GUI, disappears. The circle is programmed as a graphical overlay, to appears when the user is using the user interface to move the actuator, and disappear when the user stops using the user interface to move the actuator. It is noted that other graphical elements may be used, and the circle is just one example, for example, the icon/button pressed by the user to move the actuator may change color, and/or another graphical element such as an arrow may appear and disappear accordingly.

Optionally, the first visual indication is first detected in a first state denoting activation of the user interface by the user to initiate the movement of the actuator. In such implementation, the detected first visual indication of the first image represents the first visual indication being in a second state. The first visual indication in the first state is detected in an earlier image of the sequence of images, located earlier than the first image depicting the first visual indication in the second sate. The first state may depict the presence of the first visual indication in the corresponding image, and the second state may depict disappearance of the first visual indication from the subsequence image.

Alternatively, the first visual indication is identified by an appearance of a visual element. For example, the first visual indication is identified when a graphical element that has not previously been present on the display (e.g., within the GUI) appears in the image in response to termination of the activation of the user interface by the user.

At 108, the sequence of images is analyzed to detect a second visual indication denoting termination of the movement of the actuator in response to the termination of the user triggered activation. The image where the second visual indication is detected is sometimes referred to herein a second image. It is noted that the term 'second image' does not necessarily mean that the second visual indication is detected in the second image of the sequence, but rather the term 'second image' is used as a label for the image in which the second visual indication is found, to different from the first image in which the first visual indication is found.

Optionally, the second visual indication is identified by a removal of a previously existing visual element. For example, the second visual indication is identified when a light (or other graphical element) that has previously been present on the display (e.g., within the GUI) is removed from the image in response to termination of the activation of the user interface by the user. For example, the second visual indication is detection within the second image of a turning off of a light that is hard wired to the actuator. The light is wired to turn on during movement of the actuator (under control of the user interface), and to turn off when the actuator stops movement (under control of the user interface).

Optionally, the second visual indication is first detected in a first state denoting activation of the user interface by the user to initiate the movement of the actuator. In such implementation, the detected second visual indication of the second image represents the second visual indication being in a second state. The second visual indication in the first state is detected in an earlier image of the sequence of images, located earlier than the second image depicting the second visual indication in the second sate. The first state may depict the activation (e.g., presence) of the second visual indication in the corresponding image, for example, the light is turned on when the actuator is moving, and the second state may depict de-activation (e.g., disappearance) of the second visual indication from the subsequence image, for example the light is turned off when the actuator stops moving.

Alternatively, the second visual indication is identified by an appearance (e.g., activation) of a visual element. For example, the second visual indication is identified when a light that has previously been turned off (e.g., appears off within the GUI) is activated (e.g., appears in the image) in response to termination of the activation of the user interface by the user. In such a case, the light is wired to turn off when the actuator is moving, and to turn on when the actuator stop moving.

Optionally, the first image and/or the second image are detected by a classifier that is fed the sequence of images. The classifier is trained (e.g., using the classifier training code) to detect the first and/or second visual indications, which indicate the first and/or second image accordingly. The classifier may be trained on a training dataset of training images that include the first and/or second visual indications and corresponding labels. Exemplary classifiers include one or more neural networks of various architectures (e.g., artificial, deep, convolutional, fully connected), Markov chains, support vector machine (SVM), logistic regression, k-nearest neighbor, and decision trees.

Alternatively, the first and/or second visual indications represent a change in activation of the actuator, for example, pressing the forward button followed by pressing the left button. The change in activation may be detected by modifying the process as described herein (e.g., with reference to 106-108) to detect a change in the activation type from a first activation type (e.g., forward motion) to a second activation type (e.g., left motion), rather than activation and deactivation.

Alternatively, the first and/or second visual indications represent a start in activation of the actuator. The start of activation may be detected by modifying the process as described herein (e.g., with reference to 106-108) to detect a change from no movement to start of movement, rather than detect the change from movement to stop of movement.

At 110, an overall latency is computed from a timestamp associated with the second image and a timestamp associated with the first image. The timestamp may be set according to when the respective image was presented on the display of the client terminal, for example, the time when the respective image was screen-captured.

The overall latency may be computed as a difference between the timestamp associated with the second image and the timestamp associated with the first image.

At 112, the overall latency is evaluated as to whether or not a requirement is met. For example, whether the overall latency exceeds a threshold.

The threshold may represent the maximum overall latency where the user, using the user interface, feels a real time experience in remotely controlling the actuator. For example, when the overall latency is above the threshold, the response of the actuator deviates from the user commands inputted via the user interface in an amount that is significantly noticeable to the user, and/or which lowers the ability of the user to accurately control the actuator. For example, the user releases a move button, but the actuator keeps on moving.

The threshold may be set, for example, defined by a user, based on experiments evaluating desired thresholds by users, as a predefined system parameter, and/or dynamically set according to the user and/or actuator and/or network session (e.g., speed of movement of the actuator, where faster moving actuators require lower thresholds).

The threshold may be, for example, (e.g. about) 300, 400, 500, 600, 700, or 800 milliseconds (ms), or other smaller, intermediate, and/or larger values, or ranges thereof, for example, (about) 400-600, 500-700, 300-550, or other values.

At 114, when the overall latency is above the threshold (e.g., does not meet the requirement), one or more actions may be taken.

Optionally, an alert is generated, indicating that the overall latency is above the threshold. The alert may be provided, for example, for presentation on the display of the client terminal, and/or for presentation on a display of a client terminal used by an administrator.

Instructions may be presented to the user for recommendations on which system parameter to adjust, and/or how to adjust the system parameters. The recommendations may be defaults, based on the most common causes of high latency. For example, suggesting to the use to check strength of a wireless network connection and move closer to the wireless router, or select a better network, or wait until a good connection is found. Alternatively, the recommendations may be for manual adjustment based on the prediction made by the system parameter model. For example, to run an optimization process on the client terminal when buffering of images appears to be abnormally slow.

Alternatively or additionally, one or more system parameters of the system connecting the client terminal with the actuator and/or camera are adjusted. The adjustment may be performed automatically (e.g., by a trained machine learning adjustment model) and/or manually (e.g., by the user of the client terminal and/or by the administrator). The adjustment of the system parameter(s) may be selected according to a prediction, made automatically by the system parameter model and/or manually by a human, of a reduction in the overall latency below the threshold.

Exemplary parameters that may be adjusted in an attempt to reduce the overall latency below the threshold (i.e., to meet the requirement) include: network configuration, video format, percent of dropped frames in a video stream, reliability of network protocol, type of camera used, hardware of the actuator, and memory of client terminal allocated to buffering the video on the display.

Alternatively, when the overall latency is not above the threshold (e.g., meets the requirement), no actions are necessarily taken. The overall latency may be determined to be suitable for the network session. Monitoring of the overall latency during the current network session may proceed by iteration of features 102-114 as described herein.

At 116, one or more features described with reference to 102-114 are iterated. The iterations may be performed for monitoring one or more of: different network sessions set up by multiple clients with corresponding actuators, monitoring within the same existing network session during multiple cycles of user activation and de-activation of the actuator and/or changes in movement of the actuator.

Optionally, the features of FIG. 1 are performed by a monitoring server connected to the network. The monitoring server may be external and located remotely from the actuator and the client terminal. Such monitoring server may evaluate overall latency for multiple network sessions of multiple client terminals and corresponding multiple actuators.

Figure 3:
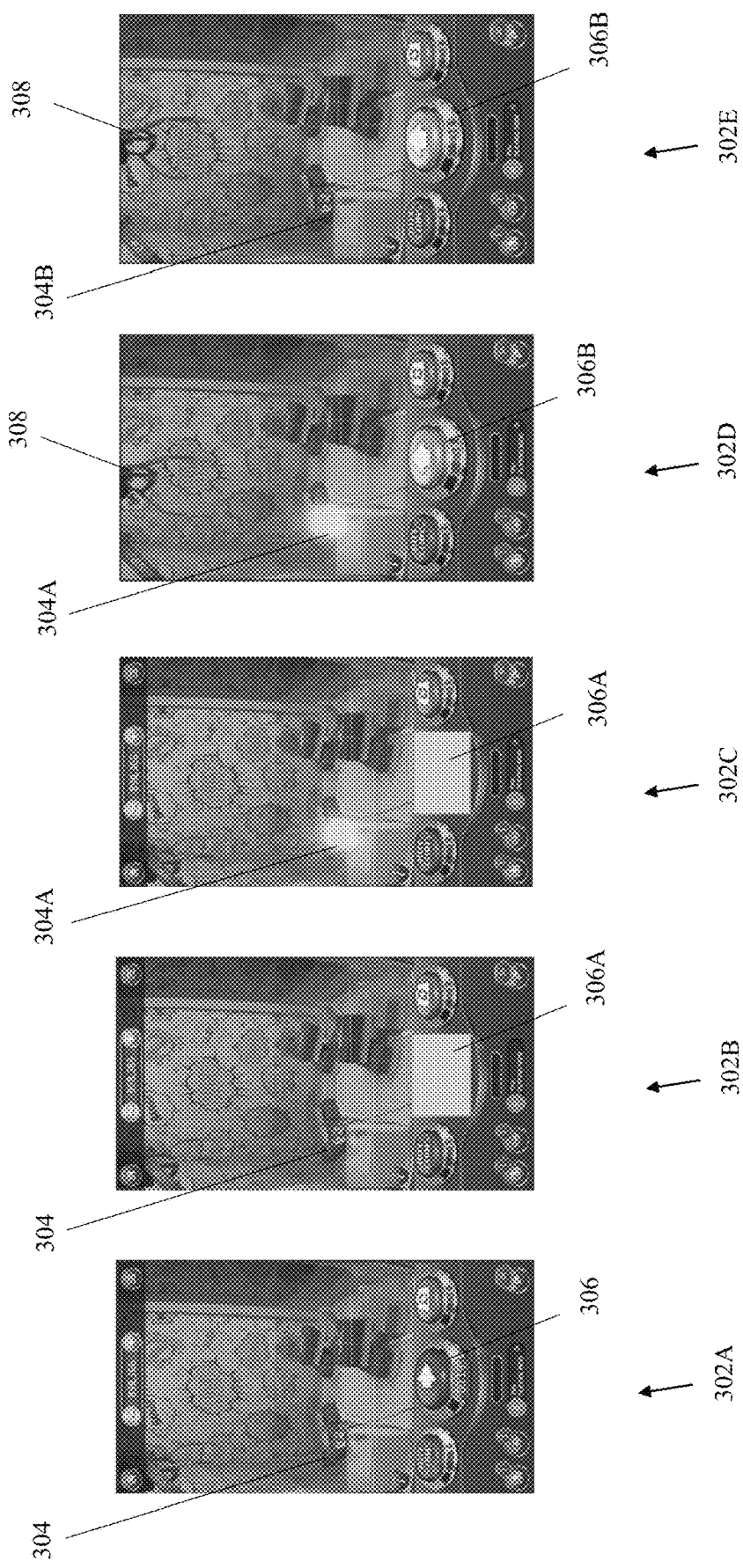
FIG. 3 includes examples of screen captures of a display of a client terminal, depicting a user interface for controlling an actuator, and images captured by a camera of the actuator during movement, in accordance with some embodiments of the present invention.

Reference is now made to FIG. 3, which includes examples of screen captures 302A-E of a display of a client terminal, depicting a user interface for controlling an actuator, and images captured by a camera of the actuator during movement, in accordance with some embodiments of the present invention. Screen captures 302A-E help explain the process of detecting the first and second visual indication, as described with reference to 106-108 of FIG. 1.

In screen captures 302A-E, a user presses a button 306 to move a claw (i.e. actuator) 308. A light 304 is hard wired to the actuator.

Screen capture 302A depicts the user interface before the user presses button 306 to move the claw, and light 304 is off.

Screen capture 302B depicts the user presses button 306 to move the claw. An overlay 306A shown as a green rectangle, has appeared over button 306. Overlay 306A denotes the first state of the first visual indication. It is noted that light 304 is still off, since the claw has not yet started moving due to the overall latency in transferring the instructions to move from the client terminal to the claw over the network.

Screen capture 302C depicts the user still pressing button 306 to move the claw. Overlay 306A is still present (since the user is still pressing button 306), denoting the first state of the first visual indication. Light 304 is now on, denoted 304A, representing the first state of the second visual indication. Turned on light 304A represents the movement of the claw in response to the user pressing button 306.

Screen capture 302D depicts the user having stopped pressing button 306 to stop movement of claw 308. Overlay 306A has now been removed, resulting in the presentation of button 306B, denoting the second state of the first visual indication. It is noted that light 304A is still on, still representing the first state of the second visual indication, since the claw has not yet stopped moving due to the network delay in transferring the instructions to stop moving from the client terminal to the claw over the network.

Image 302D is identified as the first image.

Screen capture 302E depicts the stopping of the movement of claw 308. The light is turned off 304B (since claw 308 has stopped moving) representing the second state of the second visual indication.

Image 302E is identified as the second image.

The overall latency may be computed as the time difference between the timestamp associated with image 302E and the timestamp associated with image 302D, for example, as described with reference to 110 of FIG. 1.

When the overall latency is high (e.g., above the threshold, for example, as described with reference to 112 of FIG. 1), the delay between images 302D and 302E is high, which results in a poor quality of the user experience, since the user is aware and impacted by the delay, which appears as the claw continuing to move even after the user released the movement button. When the overall latency is suitable (e.g., below the threshold), the delay between images 302D and 302E is sufficiently low, which results in a good quality of the user experience, since the user is unaware and non-impacted by the delay, which is not apparent since the claw stops moving shortly or what appears to the user to be immediately, after the user released the movement button.

Figure 4:
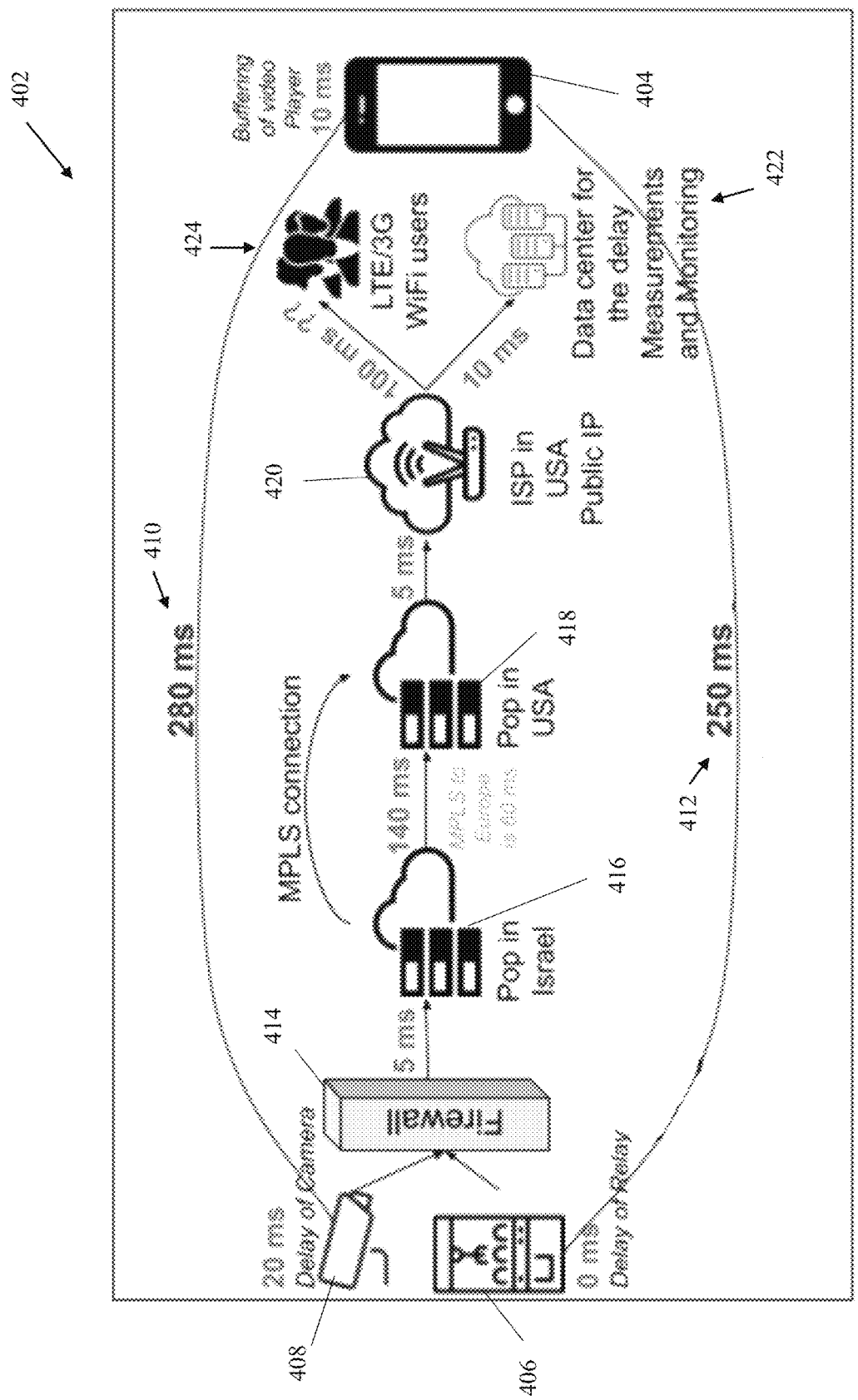
FIG. 4 is a schematic to help understand overall latency in an exemplary network with estimated delays at different components that connect a client terminal with an actuator, in accordance with some embodiments of the present invention.

Reference is now made to FIG. 4, which is a schematic 402 to help understand overall latency in an exemplary network with estimated delays at different components that connect a client terminal 404 with an actuator 406 and/or camera 408, in accordance with some embodiments of the present invention. Parameters impacting latency of exemplary components of the exemplary system of schematic 402 may be adjusted to provide the overall latency within the requirement (e.g., below the threshold), for example, as described with reference to feature 114 of FIG. 1. As shown, the overall latency is made up of the latency from camera 408 (latency of camera is 20 ms) to client terminal 404 (latency due to buffering of video at client terminal is 10 ms) (i.e., to present the images of the actuator captured by the camera on the display of the client terminal), shown as 280 milliseconds 410, and/or the latency from client terminal 404 to actuator 406 (no latency at actuator) (i.e., to provide the instructions for moving the actuator from the client terminal to the actuator), shown as 250 milliseconds 412 (total delay of 530 ms, which may be sufficient or not, depending on the set threshold).

Other exemplary components and estimated latency incurred due to the component, which may be adjusted as described herein to reduce the latency, include: firewall 414 (estimated latency of 5 ms), POP in one country 416 and POP in another country 418 connected by an MPLS connection (estimated latency of 140 ms when across the Atlantic Ocean, and estimated latency of 60 ms when in a nearby continent or same continent), ISP having public IP 420 (estimated latency of 5 ms), server for computing the overall latency 422 (estimated latency of 10 ms), and LTE/3G WiFi users 424 (estimated latency of 100 ms).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant networks will be developed and the scope of the term overall latency is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer-implemented method of monitoring overall latency, comprising:
    monitoring a sequence of images of an actuator controlled by a user interface presented on a display of a client terminal;
    detecting, in a first image of the sequence of images, a first visual indication denoting termination of a user triggered activation of movement of the actuator via the user interface;
    detecting, in another image of the sequence of images prior to the first image, the first visual indication in a first state denoting activation of the user interface by the user to initiate the movement of the actuator, wherein the detected first visual indication of the first image is the first visual indication in a second state;
    detecting, in a second image of the sequence of images, a second visual indication denoting termination of the movement of the actuator in response to the termination of the user triggered activation;
    computing an overall latency from a timestamp associated with the second image and a timestamp associated with the first image; and
    when the overall latency is above a threshold, adjusting at least one system parameter of a system connecting the client terminal with the actuator and with a camera that captures the sequence of images.

2. The computer-implemented method of claim 1, wherein the sequence of images is obtained by a screen capture operation that captures the display of the client terminal.

3. The computer-implemented method of claim 1, wherein the actuator is connected to a server in communication with the client terminal over the network.

4. The computer-implemented method of claim 1, wherein the actuator and the client terminal are geographically located at least 5000 kilometers apart.

5. The computer-implemented method of claim 1, wherein the threshold is in the range of about 400-600 milliseconds (ms).

6. The computer-implemented method of claim 1, wherein the adjusting of the at least one system parameter is selected according to a prediction by a model of a reduction in the overall latency below the threshold.

7. The computer-implemented method of claim 1, wherein the sequence of images of the actuator include graphical elements of the user interface that control the actuator when activated by a user.

8. The computer-implemented method of claim 1, wherein the first visual indication is a graphical element that is removed from the image in response to termination of the activation of the user interface by the user.

9. The computer-implemented method of claim 1, wherein the second visual indication is a turning off of a light that is hard wired to the actuator to turn off when the actuator stops movement, wherein the light is on during movement of the actuator.

10. The computer-implemented method of claim 1, wherein the first image and the second image are detected by a classifier that is fed the sequence of images, the classifier being trained on a training dataset of training images including the first and second visual indications and corresponding labels.

11. The computer-implemented method of claim 1, wherein the first state comprises presence of the first visual indication, and the second state comprises disappearance of the first visual indication.

12. The computer-implemented method of claim 1, further comprising detecting, in another image of the sequence of images prior to the second image, the second visual in a first state denoting activation of the user interface by the user to initiate the movement of the actuator, wherein the detected second visual indication of the second image is the second visual indication in a second state.

13. The computer-implemented method of claim 12, wherein the first state comprises activation of the second visual indication, and the second state comprises de-activation of the second visual indication.

14. The computer-implemented method of claim 1, the overall latency is computed as a difference between the timestamp associated with the second image and the timestamp associated with the first image.

15. The computer-implemented method of claim 1, wherein the monitoring, the detecting the first visual indication, and the detecting the second visual indication, are performed by a monitoring server connected to the network, the monitoring server being external and located remotely from the actuator and the client terminal.

16. The computer-implemented method of claim 1, wherein the actuator is connected to a crane having a claw that is operable to move the claw to a target location and grab an object.

17. The computer-implemented method of claim 1, wherein the at least one system parameter is selected from the group consisting of: network configuration, video format, percent of dropped frames in a video stream, reliability of network protocol.

18. A system for monitoring overall latency, comprising:
at least one hardware processor executing a code for:
monitoring a sequence of images of an actuator controlled by a user interface presented on a display of a client terminal;
detecting, in a first image of the sequence of images, a first visual indication denoting termination of a user triggered activation of movement of the actuator via the user interface;
detecting, in another image of the sequence of images prior to the first image, the first visual indication in a first state denoting activation of the user interface by the user to initiate the movement of the actuator, wherein the detected first visual indication of the first image is the first visual indication in a second state;
detecting, in a second image of the sequence of images, a second visual indication denoting termination of the movement of the actuator in response to the termination of the user triggered activation;
computing an overall latency from a timestamp associated with the second image and a timestamp associated with the first image; and
when the overall latency is above a threshold, adjusting at least one system parameter of a system connecting the client terminal with the actuator and with a camera that captures the sequence of images.

19. A computer program product for monitoring overall latency, comprising:
a non-transitory memory storing thereon code for execution by at least one hardware process, the code including instructions for:
monitoring a sequence of images of an actuator controlled by a user interface presented on a display of a client terminal;
detecting, in a first image of the sequence of images, a first visual indication denoting termination of a user triggered activation of movement of the actuator via the user interface;
detecting, in another image of the sequence of images prior to the first image, the first visual indication in a first state denoting activation of the user interface by the user to initiate the movement of the actuator, wherein the detected first visual indication of the first image is the first visual indication in a second state;
detecting, in a second image of the sequence of images, a second visual indication denoting termination of the movement of the actuator in response to the termination of the user triggered activation;
computing an overall latency from a timestamp associated with the second image and a timestamp associated with the first image; and
when the overall latency is above a threshold, adjusting at least one system parameter of a system connecting the client terminal with the actuator and with a camera that captures the sequence of images.

* * * * *